United States Patent
Rukavina

(10) Patent No.: US 7,767,310 B2
(45) Date of Patent: Aug. 3, 2010

(54) PRIMER COMPOSITION AND ARTICLES INCORPORATING THE PRIMER

(75) Inventor: Thomas G. Rukavina, New Kensington, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 564 days.

(21) Appl. No.: 11/584,860

(22) Filed: Oct. 23, 2006

(65) Prior Publication Data

US 2010/0086773 A1    Apr. 8, 2010

(51) Int. Cl.
*B32B 27/06* (2006.01)
*B32B 27/40* (2006.01)
*B32B 27/38* (2006.01)

(52) U.S. Cl. .................... 428/448; 428/414; 428/423.1; 428/447

(58) Field of Classification Search ........................ None
See application file for complete search history.

(56) References Cited

U.S. PATENT DOCUMENTS

| | | |
|---|---|---|
| 3,759,751 A | 9/1973 | Smith et al. |
| 4,112,171 A * | 9/1978 | Motter et al. ............... 428/213 |
| 4,379,040 A | 4/1983 | Gillery |
| 4,755,251 A | 7/1988 | Cline et al. |
| 4,861,669 A | 8/1989 | Gillery |
| 4,898,789 A | 2/1990 | Finley |
| 4,898,790 A | 2/1990 | Finley |
| 4,900,633 A | 2/1990 | Gillery |
| 4,920,006 A | 4/1990 | Gillery |
| 4,938,857 A | 7/1990 | Gillery |
| 5,328,768 A | 7/1994 | Goodwin |
| 5,445,871 A * | 8/1995 | Murase et al. ............... 428/215 |
| 5,466,727 A | 11/1995 | Hsieh |
| 5,466,729 A * | 11/1995 | Guillet et al. ................ 523/421 |
| 5,492,750 A | 2/1996 | Shumaker, Jr. et al. |
| 5,840,429 A * | 11/1998 | Rukavina et al. ............. 428/412 |
| 6,506,921 B1 * | 1/2003 | Wilkes et al. ................ 556/413 |

* cited by examiner

*Primary Examiner*—Michael J Feely
(74) *Attorney, Agent, or Firm*—Andrew C. Simiherio

(57) ABSTRACT

A primer composition includes the reaction product of (a) a polyglycidyl ether of a hydroxy-functional material; and (b) an amino polyalkoxysilane. The reaction product, when hydrolyzed, comprises at least 6 silanol groups, such as at least 8 silanol groups, such as at least 10 silanol groups, such as at least 12 silanol groups.

26 Claims, 1 Drawing Sheet

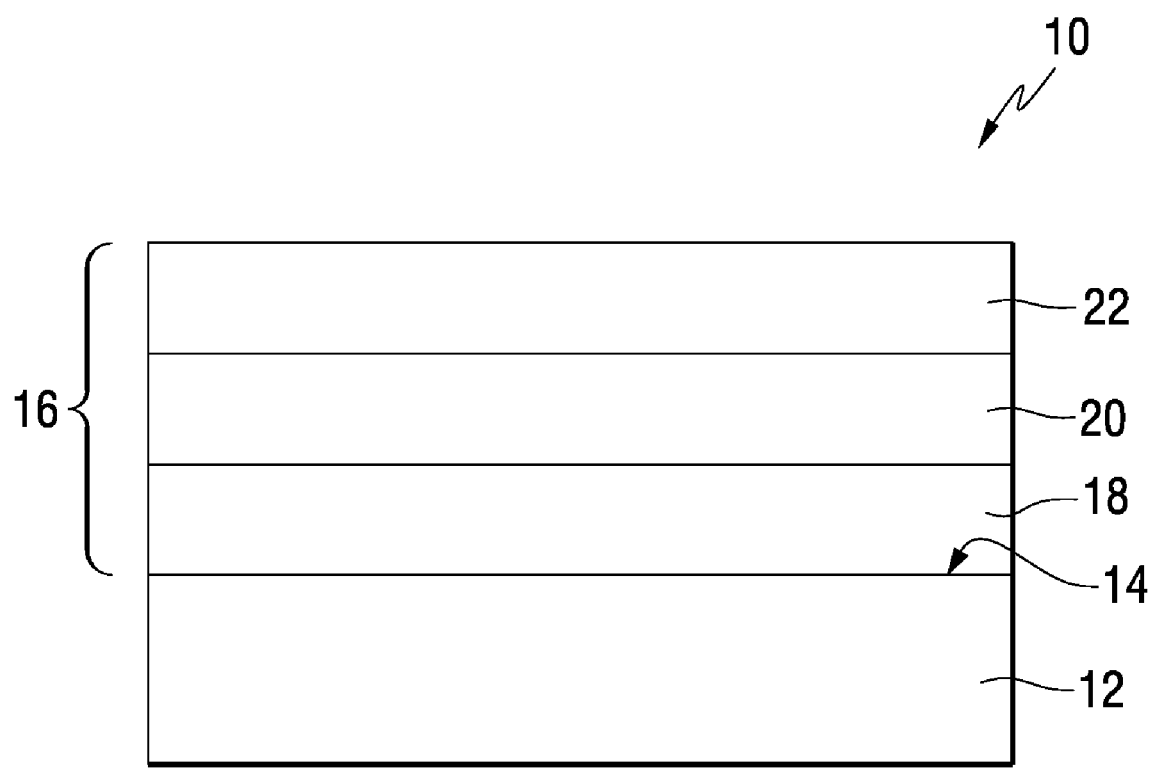

US 7,767,310 B2

PRIMER COMPOSITION AND ARTICLES INCORPORATING THE PRIMER

BACKGROUND OF THE INVENTION

1. Field of the Invention

This application relates generally to primer compositions and articles incorporating the primer and, in one particular non-limiting embodiment, to a primer composition particularly useful for application onto polymeric substrates.

2. Technical Considerations

In the aviation industry, it is known to apply a microwave-absorbing material onto a glass aircraft transparency to help shield the aircraft instrumentation and the pilot from potentially harmful microwave radiation entering the aircraft. In one process, a microwave radiation-absorbing coating is applied onto a glass aircraft transparency substrate at elevated temperatures. This known process works well when coating glass substrates. However, more and more aircraft are being fitted with polymeric transparencies rather than glass transparencies to try to reduce the overall weight of the aircraft. When this known process of coating at elevated temperatures is practiced on polymeric substrates, as the polymeric substrate shrinks upon cooling, a compressive force is applied to the radiation-absorbing coating due to the increased thermal expansion and contraction forces associated with polymeric substrates as compared to glass substrates. This compressive force can cause the radiation-absorbing coating to either crack or pop off of the substrate as the substrate shrinks during cooling. Therefore, it is known to apply a primer layer onto the polymeric substrate before application of the radiation-absorbing coating. The primer layer acts as a buffer and helps protect the radiation-absorbing coating from the compressive forces caused by shrinkage of the plastic substrate.

However, problems still exist with the current process. For example, the primer layer must not only be strongly bonded to the underlying plastic substrate but must also bond strongly to the radiation-absorbing coating applied thereon. Additionally, it would be advantageous to decrease the resistance (ohms per square) of the radiation-absorbing coating to increase the protective properties of the coating. However, decreasing the resistance generally requires increasing the thickness of the coating. For example, if a particular coating provides a resistance of 20 ohms per square at a thickness of 3,500 Å, to decrease the resistance to 10 ohms per square typically requires doubling the thickness of the coating to 7,000 Å. Known primers are currently not capable of adhering a 10 ohm per square coating onto a plastic substrate using an elevated heating deposition process because the coating and/or primer delaminates from the substrate. In addition, the thicker the coating the more compressive stress that is applied as the polymeric substrate cools and, therefore, the more difficult it is to adhere the coating onto the substrate.

Therefore, it would be desirable to provide a primer that overcomes or reduces at least some of the problems discussed above with respect to known primers.

SUMMARY OF THE INVENTION

A primer composition of the invention comprises the reaction product of: (a) a polyepoxide, and (b) an amino functional silane. The reaction product, when hydrolyzed, comprises at least 6 silanol groups. In one non-limiting embodiment, the reaction product comprises at least 8 silanol groups, such as at least 10 silanol groups, such as at least 12 silanol groups.

A coated article of the invention comprises a substrate and a primer formed over at least a portion of the substrate. The primer comprises the reaction product of (a) a polyepoxide; and (b) an amino functional silane. The reaction product, when hydrolyzed, comprises at least 6 silanol groups. In one non-limiting embodiment, the reaction product comprises at least 8 silanol groups, such as at least 10 silanol groups, such as at least 12 silanol groups.

An aircraft transparency of the invention comprises a substrate, a primer formed over at least a portion of the substrate, a radiation protective coating formed over at least a portion of the primer, and an optional overcoat formed over at least a portion of the radiation protective coating. The primer comprises the reaction product of a polyepoxide and an amino functional silane. The reaction product, when hydrolyzed, comprises at least 6 silanol groups, such as at least 8 silanol groups. In one non-limiting embodiment, the reaction product comprises at least 10 silanol groups, such as at least 12 silanol groups. In a further non-limiting embodiment, the radiation protective coating has a sheet resistance less than or equal to 20 ohms per square, such as less than or equal to 15 ohms per square, such as less than or equal to 10 ohms per square. In one particular non-limiting embodiment, the radiation protective coating has a thickness of at least 3,500 Å, such as at least 4,000 Å, such as at least 4,500 Å, such as at least 5,000 Å, such as at least 5,500 Å, such as at least 6,000 Å, such as at least 6,500 Å, such as at least 7,000 Å.

Another aircraft transparency of the invention comprises a plastic substrate, such as but not limited to a polycarbonate resin thermoplastic, a primer formed over at least a portion of the substrate. The primer comprises the reaction product of: (a) phenol, 4,4'-(1-methylethylidene)bis-, polymer with 2,2'-[(1-methylethylidene) bis(4,1-phenyleneoxymethylene)] bis [oxirane], and (b) bis(trimethoxysilylpropyl)amine. The reaction product, when hydrolyzed, comprises at least 12 silanol groups. The transparency further comprises a radiation protective coating formed over at least a portion of the primer. The protective coating comprises indium tin oxide and has a sheet resistance of less than or equal to 10 ohms per square. An optional overcoat is formed over at least a portion of the radiation protective coating, the overcoat comprising at least one of polyurethane or siloxane.

BRIEF DESCRIPTION OF THE DRAWING

FIG. 1 is a side view (not to scale) of an aircraft transparency incorporating features of the invention.

DESCRIPTION OF THE PREFERRED EMBODIMENTS

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Further, as used herein, the terms "applied over", "formed over", "deposited over", or "provided over" mean applied, formed, deposited, or provided on but not necessarily in contact with the surface. For example, a coating layer "formed over" a substrate does not preclude the presence of one or more other coating layers films of the same or different composition located between the formed coating layer and the substrate. As used herein, the terms "polymer" or "polymeric" include oligomers, homopolymers, copolymers, and terpolymers, e.g., polymers formed from two or more types of monomers or polymers. The terms "visible region" or "visible light" refer to electromagnetic radiation having a wavelength in the range of 380 nm to 800 nm. The terms "infrared region" or "infrared radiation" refer to electromagnetic radiation having a wavelength in the range of greater than 800 nm to 100,000 nm. The terms "ultraviolet region" or "ultraviolet radiation" mean electromagnetic energy having a wavelength in the range of 300 nm to less than 380 nm. The terms "microwave region" or "microwave radiation" mean electromagnetic energy having a wavelength in the range of 1 GHz to 30 GHz. Additionally, all documents, such as but not limited to issued patents and patent applications, referred to herein are to be considered to be "incorporated by reference" in their entirety. The terms "radiation protective coating" or "protective coating" refer to a coating provided to reflect, absorb, or otherwise decrease the transmittance of a selected radiation range through the coating. However, the radiation protective coating could also provide properties other than reflection, absorption, or decreased transmission of the selected radiation, such as, for example, ultraviolet (UV) radiation absorption or reflection and/or infrared (IR) absorption or reflection, and/or visible light absorption or reflection. In the following discussion, the term "film" refers to a region of a coating having a desired or selected composition. A "layer" comprises one or more "films". A "coating" or "coating stack" is comprised of one or more "layers". Any reference to amounts, unless otherwise specified, is "by weight percent".

For purposes of the following discussion, the invention will be described with reference to use with an aircraft transparency, in particular an aircraft window. However, it is to be understood that the invention is not limited to use with aircraft windows but could be practiced in any desired field, such as but not limited to laminated or non-laminated vehicle transparencies, residential and/or commercial windows, insulating glass units, and/or transparencies for land, air, space, above water and under water vehicles, e.g., automotive windshields, sidelights, back lights, sunroofs, and moon roofs, just to name a few. Therefore, it is to be understood that the specifically disclosed exemplary embodiments are presented simply to explain the general concepts of the invention and that the invention is not limited to these specific exemplary embodiments. Additionally, while a typical aircraft "transparency" can have sufficient visible light transmittance such that materials can be viewed through the transparency, in the practice of the invention, the "transparency" need not be transparent to visible light but may be translucent or opaque (as described below). The radiation protective coating of the invention can be utilized in making laminated or non-laminated, e.g., single ply or monolithic, articles. By "monolithic" is meant having a single structural substrate or primary ply, e.g., a glass ply or a polymeric ply. By "primary ply" is meant a primary support or structural member. In the following discussion, the exemplary article (whether laminated or monolithic) is described as an aircraft transparency.

An exemplary coated article in the form of an aircraft transparency 10 incorporating features of the invention is shown in FIG. 1. The transparency 10 includes a substrate 12 which can have at least one major surface 14. A composite coating 16 of the invention is applied over at least a portion of the substrate 12, such as over at least a portion of the major surface 14. The composite coating 16 comprises a primer layer or primer 18 of the invention formed over at least a portion of the substrate 12, such as over at least a portion of the major surface 14. A radiation protective coating 20 is formed over at least a portion of the primer 18. An optional overcoat 22 can be formed over at least a portion of the protective coating 20.

In the broad practice of the invention, the substrate 12 of the transparency 10 can include any desired material having any desired characteristics. For example, in one non-limiting embodiment the substrate 12 can be transparent to visible light. By "transparent" is meant having visible light transmittance of greater than 0% to 100%. Alternatively, in another non-limiting embodiment the substrate 12 can be translucent. By "translucent" is meant allowing electromagnetic energy (e.g., visible light) to pass through but diffusing this energy such that objects on the side opposite the viewer are not clearly visible. Examples of suitable materials include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof), or thermoplastic materials; ceramic substrates; glass substrates; or mixtures or combinations of any of the above. Alternatively, the substrate 12 can be conventional soda-lime-silicate glass, borosilicate glass, or leaded glass. The glass can be clear glass. By "clear glass" is meant non-tinted or non-colored glass. Alternatively, the glass can be tinted or otherwise colored glass. The glass can be annealed or heat-treated glass. As used herein, the term "heat treated" means tempered or at least partially tempered. The glass can be of any type, such as conventional float glass, and can be of any composition having any optical properties, e.g., any value of visible transmission, ultraviolet transmission, infrared transmission, and/or total solar energy transmission. The substrate 12 can be of any desired dimensions, e.g., length, width, shape, or thickness. In one exemplary embodiment, the substrate 12 comprises a thermoplastic and has a thickness in the range of 1 mm to 10 mm thick, e.g., 1 mm to 5 mm, e.g., 1.5 nun to 5 mm, e.g., 2 mm to 5 mm, e.g., 3 mm to 4 mm, e.g., 3.2 mm. In one non-limiting embodiment, the substrate 12 comprises LEXAN® plastic commercially available from the General Electric Company of Pittsfield, Mass.

In one non-limiting embodiment, the primer 18 comprises the reaction product of a polyepoxide and an amino functional silane. The reaction product, when hydrolyzed, comprises at least 6 silanol groups, such as at least 8 silanol groups, such as at least 10 silanol groups, such as at least 12 silanol groups.

In one non-limiting embodiment, the polyepoxide comprises at least two epoxy groups. The polyepoxide can be, for example, a polyglycidyl epoxy. In one specific non-limiting embodiment, the polyepoxide comprises phenol, 4,4'-(1-methylethylidene)bis-, polymer with 2,2'-[(1-methylethylidene) bis(4,1-phenyleneoxymethylene)] bis[oxirane]. A suitable polyepoxide for the practice of the invention is EPON 1001F epoxy (commercially available from Hexion Speciality Chemicals, Inc. of Houston, Tex.).

In one non-limiting embodiment, the amino functional silane comprises an amino functional polyalkoxy silane, such as an amino functional bis-alkoxysilane. In one non-limiting embodiment, the silane comprises at least two silyl groups per molecule. In one particular non-limiting embodiment, the silane is a polymethoxysilane, such as a trimethoxysilane. In one specific non-limiting embodiment, the amino functional silane comprises bis(trimethoxysilylpropyl)amine. A suitable amino functional silane for the practice of the invention is Silquest A-1170 silane (commercially available from GE Advanced Materials of South Charleston, W. Va.).

In making the reaction product, one of ordinary skill in the art will appreciate that the amount of amino functional material added to the polyepoxide depends upon the number of reactive epoxy groups on the polyepoxide. For example, if the polyepoxide has two reactive epoxy groups, then two moles of the amino functional material will be added to one mole of the polyepoxide.

The primer layer 18 can be of any desired thickness. However, in one non-limiting embodiment, the primer layer 18 has a thickness in the range of greater than 0 to 10 microns, such as 1 to 10 microns, such as 1 to 8 microns, such as 1 to 6 microns, such as 2 to 6 microns, such as 2 to 4 microns.

The radiation protective coating 20 comprises one or more layers of materials that reflect, absorb, and/or otherwise reduce or prevent radiation of a selected wavelength or wavelength range from passing therethrough. In the general practice of the invention, the protective coating 20 can comprise any conventional radiation absorbing or reflecting material known in the art. In one non-limiting embodiment, the radiation protective coating 20 comprises one or more metal oxide materials that reduce or prevent the passage of microwave radiation through the transparency 10.

Exemplary metal oxide materials for use in the present invention include, but are not limited to, silica, alumina, zinc oxide, tin oxide, indium oxide, indium tin oxide (ITO), niobium oxide, tantalum oxide, zirconia, titania, zinc and tin materials (such as but not limited to zinc stannate), and oxides, nitrides, or oxynitrides of any of the above metals or any mixtures containing any one or more of the above materials. The radiation protective coating 20 can additionally include one or more dopants. Exemplary dopants can be selected from, but are not limited to, chromium, hafnium, yttrium, nickel, boron, phosphorous, titanium, zirconium, tantalum, niobium and mixtures or combinations thereof.

The protective coating 20 can also include one or more additives or dopants to affect the properties of the protective coating 20, such as refractive index, photocatalytic activity, and other like properties known to those skilled in the art. Examples of dopants include, but are not limited to, sodium, nickel, transition metals, and mixtures containing any one or more of the foregoing.

The protective coating 20 can be of any thickness to achieve the desired radiation protection. As will be appreciated by one skilled in the art, the specific thickness of the protective coating 20 can vary depending upon the selected material(s) in order to achieve the desired radiation protection. In one non-limiting embodiment, the protective coating 20 has a thickness sufficient to provide a resistance less than or equal to 20 ohms per square, such as less than or equal to 18 ohms per square, such as less than or equal to 16 ohms per square, such as less than or equal to 15 ohms per square, such as less than or equal to 13 ohms per square, such as less than or equal to 11 ohms per square, such as less than or equal to 10 ohms per square. In one particular non-limiting embodiment, the protective coating has a thickness of at least 3,500 Å, such as at least 4,000 Å, such as at least 4,500 Å, such as at least 5,000 Å, such as at least 5,500 Å, such as at least 6,000 Å, such as at least 6,500 Å, such as at least 7,000 Å. In one particular non-limiting embodiment, the protective coating 20 comprises indium tin oxide.

The protective coating 20 can be deposited by any conventional method, such as but not limited to conventional chemical vapor deposition (CVD) and/or physical vapor deposition (PVD) methods. Examples of CVD processes include spray pyrolysis. Examples of PVD processes include electron beam evaporation and vacuum sputtering (such as magnetron sputter vapor deposition (MSVD)). Other coating methods could also be used, such as but not limited to sol-gel deposition. In one non-limiting embodiment, the protective coating 20 can be deposited by MSVD. Examples of MSVD coating devices and methods will be well understood by one of ordinary skill in the art and are described, for example, in U.S. Pat. Nos. 4,379,040; 4,861,669; 4,898,789; 4,898,790; 4,900,633; 4,920,006; 4,938,857; 5,328,768; and 5,492,750.

The overcoat 22 comprises a material that provides mechanical and/or chemical protection to the underlying coating layers. In one non-limiting embodiment, the overcoat 22 comprises polyurethane having a thickness in the range of 1 to 10 mils (0.0025 cm to 0.025 cm), such as 2 to 8 mils (0.005 cm to 0.0203 cm), such as 2 to 5 mils (0.005 cm to 0.0127 cm). In another non-limiting embodiment, the overcoat 22 comprises siloxane having a thickness in the range of 1 to 10 microns, such as 2 to 8 microns, such as 3 to 4 microns.

The present invention will be described further by reference to the following example. The following example is merely illustrative of the general concepts of the invention and is not intended to be limiting. Unless otherwise indicated, all parts and percentages in the following examples, as well as throughout the specification, are by weight.

EXAMPLE

This Example illustrates a method of making a primer composition of the invention.

91.5 grams of Epon 1001F epoxy (commercially available from Hexion Speciality Chemicals, Inc. of Houston, Tex.) was dissolved in 274.5 grams of Dowanol PM solvent (commercially available from Dow Chemical Company of Midland, Mich.) to make a 25% solution. 58 grams of A-1170 amino silane (commercially available from GE Advanced Materials of South Charleston, W. Va.) was added, stirred and reacted with the Epon 1001F epoxy for 2 hours at 180° F. (82° C.) to react all or substantially all of the amine groups with the epoxy groups. The solution was allowed to cool to room temperature. 9.3 grams of water was added to 738 grams of Dowanol PM and stirred. The 25% epoxy/silane solution was then added to the Dowanol PM/water solution and stirred for 1 hour. 337.5 grams of butyl cellosolve solvent (2-butoxy ethanol; commercially available from Dow Chemical Company of Midland, Mich.) was added and stirred to make a 10% solids primer solution. 0.4 grams of BYK 306 surfactant (commercially available from BYK Chemie) was added and stirred for 10 minutes. The primer was then ready to be applied to a Lexan® substrate.

The above 10% solution was applied to the Lexan® substrate via flow coating. The coating was air-dried for 45 minutes or until tack-free. The coated substrate was then placed in an oven and cured for 2 hours at 254° F. (118° C.).

The primed substrate was transferred to a conventional MSVD coater where indium tin oxide was applied at a thickness to provide a resistance of 10 ohm/square. A polyurethane overcoat having a thickness of 3 mils (0.00762 cm) was then applied over the indium tin oxide layer and the coated substrate was then processed into a window.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A coated article, comprising:
  a substrate;
  a primer formed over at least a portion of the substrate, wherein the primer comprises the reaction product of:
    (a) a polyepoxide; and
    (b) an amino functional silane,
  and wherein the reaction product, when hydrolyzed, comprises at least 8 silanol groups; and
  a radiation protective coating formed over at least a portion of the primer.
2. The article of claim 1, wherein (a) comprises a polyepoxide having at least 2 epoxy groups.
3. The article of claim 1, wherein (a) comprises a polyglycidyl epoxy.
4. The article of claim 1, wherein (a) comprises phenol, 4,4'-(1-methylethylidene)bis-, polymer with 2,2'-[(1-methylethylidene) bis(4,1-phenyleneoxymethylene)] bis[oxirane].
5. The article of claim 1, wherein (b) comprises an amino functional polyalkoxy silane.
6. The article of claim 1, wherein (b) comprises a polymethoxysilane.
7. The article of claim 1, wherein (b) comprises bis(trimethoxysilylpropyl)amine.
8. The article of claim 1, wherein the reaction product comprises at least 10 silanol groups when hydrolyzed.
9. The article of claim 1, wherein the reaction product comprises at least 12 silanol groups when hydrolyzed.
10. The article of claim 1, wherein the primer has a thickness in the range of 1 to 10 microns.
11. The article of claim 1, wherein the primer has a thickness in the range of 2 to 4 microns.
12. The article of claim 1, wherein the substrate comprises a thermoplastic material.
13. The article of claim 1, wherein the substrate has a thickness in the range of 3 to 4 mm.
14. The article of claim 1, wherein the article is an aircraft transparency.
15. A coated article, comprising
  a substrate;
  a primer formed over at least a portion of the substrate, wherein the primer comprises the reaction product of:
    (a) a polyepoxide; and
    (b) an amino functional silane,
  and wherein the reaction product, when hydrolyzed, comprises at least 6 silanol groups; and
  a radiation protective coating formed over at least a portion of the primer and an overcoat formed over at least a portion of the radiation protective coating.
16. The article of claim 15, wherein the radiation protective coating comprises a metal oxide.
17. The article of claim 15, wherein the radiation protective coating comprises indium tin oxide.
18. The article of claim 15, wherein the radiation protective coating has a sheet resistance less than or equal to 20 ohms per square.
19. The article of claim 15, wherein the radiation protective coating has a sheet resistance less than or equal to 15 ohms per square.
20. The article of claim 15, wherein the radiation protective coating has a sheet resistance less than or equal to 10 ohms per square.
21. The article of claim 15, wherein the radiation protective coating has a thickness of at least 3,500 Å.
22. The article of claim 15, wherein the radiation protective coating has a thickness of at least 5,000 Å.
23. The article of claim 15, wherein the radiation protective coating has a thickness of at least 7,000 Å.
24. The article of claim 15, wherein the overcoat comprises polyurethane.
25. The article of claim 15, wherein the overcoat comprises siloxane.
26. An aircraft transparency, comprising:
  a substrate comprising a thermoplastic material;
  a primer formed over at least a portion of the substrate, the primer comprising the reaction product of:
    (a) phenol, 4,4'-(1-methylethylidene)bis-, polymer with 2,2'-[(1-methylethylidene) bis(4,1-phenyleneoxymethylene)] bis[oxirane]; and
    (b) bis(trimethoxysilylpropyl)amine, wherein the reaction product, when hydrolyzed, comprises at least 12 silanol groups;
  a radiation protective coating formed over at least a portion of the primer, the protective coating comprising indium tin oxide and having a sheet resistance less than or equal to 10 ohms per square; and
  an overcoat formed over at least a portion of the radiation protective coating, wherein
    the overcoat comprises at least one of polyurethane or siloxane.

* * * * *